United States Patent [19]
Vande Berg

[11] Patent Number: 5,856,637
[45] Date of Patent: Jan. 5, 1999

[54] WEIGHING SCALE FOR MOVING LOADS

[76] Inventor: David M. Vande Berg, 317 4th Ave. SE., Sioux Center, Iowa 51250

[21] Appl. No.: 874,402

[22] Filed: Jun. 13, 1997

Related U.S. Application Data

[63] Continuation-in-part of Ser. No. 334,957, Nov. 7, 1994, abandoned.

[51] Int. Cl.[6] .......................... G01G 19/00; G01G 21/22; G01G 21/10
[52] U.S. Cl. .......................... 177/145; 177/163; 177/189
[58] Field of Search .................................. 177/109, 110, 177/119, 145, 161, 163, 187, 189, 201, 255, 256, DIG. 9; 198/465.4, 687.1, 959, 477.1, 579; 209/645, 646

[56] References Cited

U.S. PATENT DOCUMENTS

| | | | |
|---|---|---|---|
| 2,816,643 | 12/1957 | Klamp | 198/477 |
| 3,960,262 | 6/1976 | Henig | 198/579 |
| 4,062,414 | 12/1977 | Cook | 177/145 |
| 4,122,940 | 10/1978 | Hoffman | 198/959 |
| 4,726,435 | 2/1988 | Kitagawa et al. | 177/187 |
| 5,096,007 | 3/1992 | Burkhard | 177/187 |
| 5,111,896 | 5/1992 | Porcari et al. | 177/187 |

FOREIGN PATENT DOCUMENTS

| | | | |
|---|---|---|---|
| 150-409 | 9/1981 | Germany | 177/163 |

*Primary Examiner*—Randy W. Gibson

[57] ABSTRACT

A weighing system for material suspended from a rail or trolley. The system includes a transition track between the regular track and the weighing track to avoid oscillation of pressure on the weighing track which causes difficulty in rapidly arriving at a proper weight. The transition track is biassed away from the weighing track so as not to cause a false weight reading. It also includes a novel trolley moving mechanism for moving the trolley as it passes over the weighing mechanism.

6 Claims, 2 Drawing Sheets

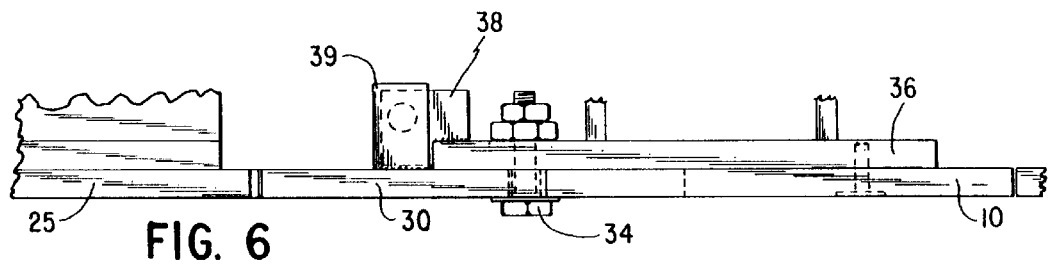
FIG. 6
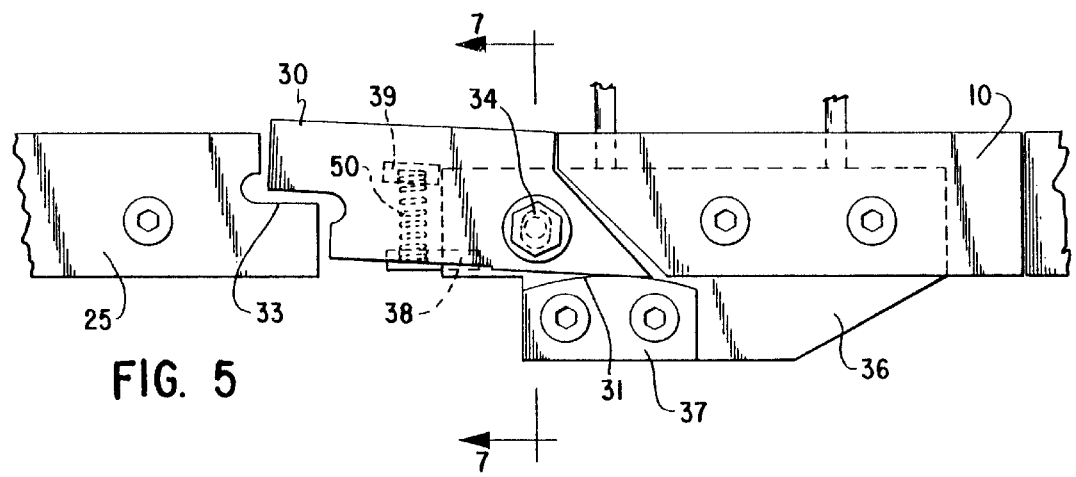
FIG. 5
FIG. 7
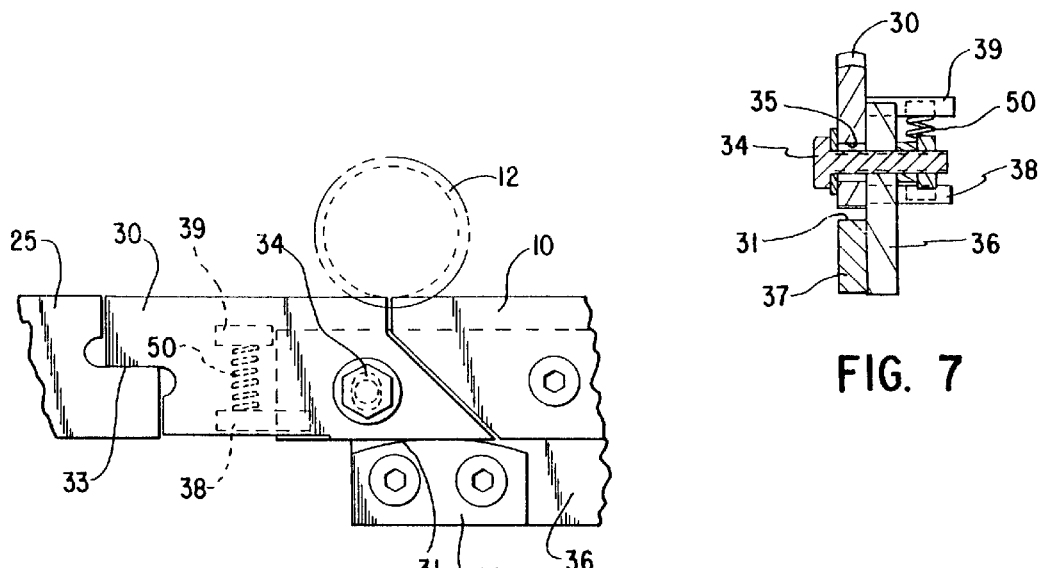
FIG. 8

WEIGHING SCALE FOR MOVING LOADS

BACKGROUND AND SUMMARY OF THE INVENTION

This invention pertains to a weighing mechanism designed to provide a more accurate weight in less time than present systems. This application is a continuation-in-part of a previous application by the same inventor, Ser. No. 08/334,957, filed Nov. 7, 1994 and now specifically abandoned.

Weighing systems for material suspended from a trolley rolling on a standing rail are fairly common. That material consists usually of meat carcasses, but may also include some other types of material. The purpose is to roll the trolley along the rail by the operation of a chain having a dog to engage the trolley to pull it over a short section of suspended track separated from the rest of the rail. The live track—that free section—is supported by weighing cells of various types. These cells may be strain gage type devices, thus a type of spring device, which provide for a measured displacement or measurable displacement to indicate the weight.

There are a number of problems with such a system. One of the chief of these problems is the oscillation of the free track caused by sudden loading of the spring-like devices which support that part of the track. The carrying trolley typically has only a single load-carrying wheel having linear contact with the track. Thus, any transition from one part of the rail to another is very quick, going from no load to full load almost instantaneously. Such a quick bounce creates an oscillation in the weighing cells making necessary an appreciable time for damping before the weight can be accurately measured.

There is another factor entering into the same problem. That factor is the motor force moving the trolley along the rail. In most instances that force is provided by a chain pulling the trolley along the rail through a dog on the chain engaging, either directly or indirectly through an arm, the top of the trolley. This engagement, particularly when the transition between the regular rail and the live rail is reached, is somewhat jerky resulting in a swinging load on the trolley. Such swinging also contributes to objectionable oscillation in the scale. The contact with the chain may also create a small component of vertical force creating a false reading of the scale.

The swinging problem is worsened by another system sometimes used to advance the trolley. This other system utilizes a downward slope on the live track to cause the trolley to roll. Trolleys in such a system must be freely rolling (well lubricated). Here again, the transition from regular to live rail is very quick so that the bouncing oscillation is enlarged. Swinging may also be encouraged by the slight bump between the two portions of the rails.

It should also be noted that flat or out-of-round wheels can also contribute to a bouncing oscillation.

It is the purpose of the present invention to avoid, so far as possible, any bouncing or swinging of the load as it passes over the live track. This is accomplished by use of a transitional rail to load the live rail more gradually and a unique separate transporting system to move the trolley on the live track. Thus, the bouncing is virtually eliminated and the swinging is reduced. To avoid an uncertain tare weight, the transitional rail is normally kept out of contact with the live rail.

BRIEF DESCRIPTION OF THE DRAWINGS

FIG. 5 is a detailed elevational view to an enlarged scale of the transition rail and its surrounding parts.

FIG. 6 is a top plan view of the parts shown in FIG. 5,

FIG. 7 is a sectional view from line 7—7 of FIG. 5, and

FIG. 8 is a view similar to FIG. 5 showing the parts just before the trolley is weighed.

DESCRIPTION

Figure 4:
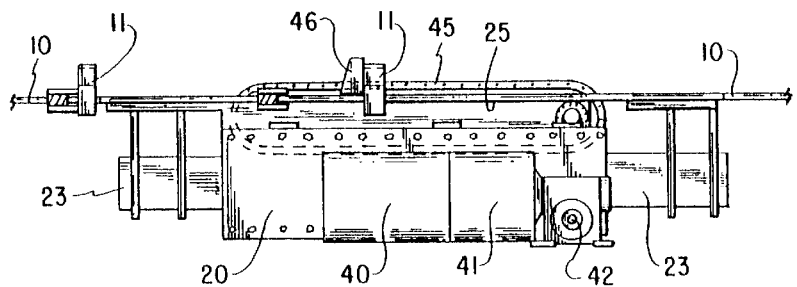
FIG. 4 is a plan view from line 4—4 of FIG. 2.

Briefly this invention comprises a unique system of transmitting a trolley-suspended load from a fixed track to a live track for weighing the load. More specifically and referring to the drawings, the system includes a customary, basic, fixed track 10 on which trolleys 11 run. The trolleys normally include a single wheel 12 journalled to a hanging strap 13 and ending in a hook 14 from which the load is hung. The wheel 12 is grooved so that it will stay on the track 10.

The trolley 11 is moved along the track 10 by a moving chain 15 linked to a series of arms 16. The arms 16 carry wheels 17 adapted to roll on a second track 18 parallel to but disposed above the carrying track 10. To maintain flexibility of use and free rolling for the trolleys 11, each arm 16 carries an engagement dog 19 at its lower end in position to engage each single trolley 11. The arm 16 by engagement between the dog 19 and the trolley 11 pushes the trolley along its track as required, but leaves the trolley to roll freely where the push is not required. This feature makes possible a feature of this invention which will be described later.

The weighing mechanism, for weighing each trolley and its load as the trolley moves along the track, ordinarily includes a scale mechanism 20 mounted on a beam 23. The beam 23 is fixed to the track 10 so that a cut track will still have both ends supported. The weighing mechanism is arranged to support a short section 25 of the track 10 which is cut from the track. The support is from supports in the weighing mechanism which are carried by springs or strain gage devices of various kinds well known in the art.

Figure 2:
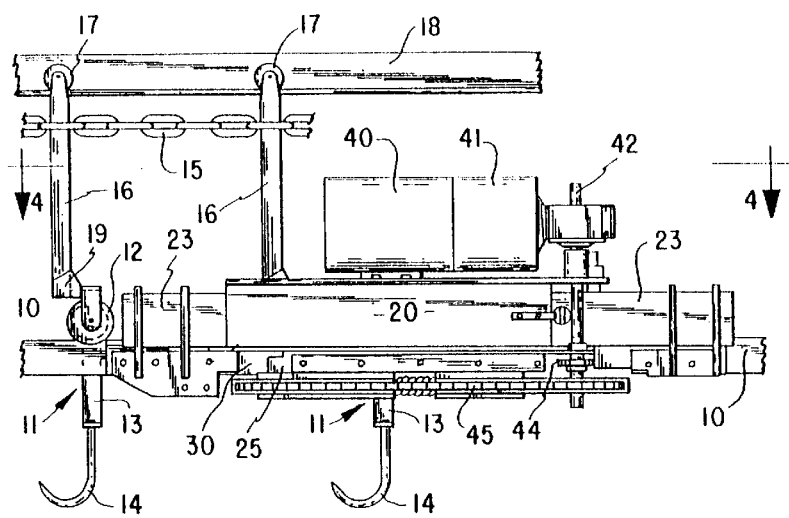
FIG. 2 is a rear elevational view of the system.
Figure 1:
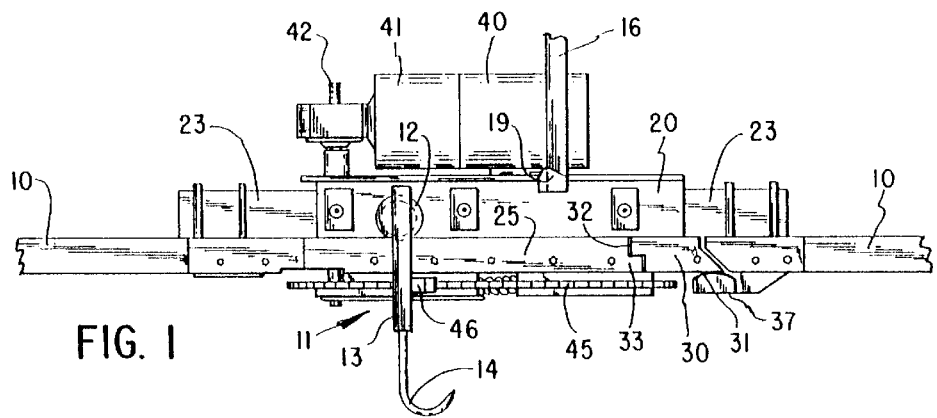
FIG. 1 is a front elevational view of the system at the region of the live track.

Normally, the section 25 is simply cut from the track and catches the trolley wheel 12 from the fixed track 10 as the trolley rolls past. The section 25 thus actuates the weighing mechanism. However, the actuation is sudden and causes oscillating fluctuation of readings of weight. The present invention provides a vast improvement by alleviating that problem. Instead of a simple cut in the track 10, a transitional piece 30 (FIGS. 1 and 2) is fastened to the fixed track near the entry side of the split track piece 25 at a pivot line. The pivot 31 is formed simply by use of a spherical surface on top of a block 37 fixed to the track 10. The transition rail 30 rests on the spherical surface of the pivot line 31 and thus is free to rock on that surface. Opposite the pivot line 31 on the transitional rail 30, a projection 32 is arranged to engage an opposite projection 33 on the weighing track section 25. Thus, any vertical pressure on the transitional rail 30 will be shared between the pivot line 31 and the projections 32 and 33. A bolt 34 extending through an enlarged hole 35 may be used to keep the transitional piece from tipping laterally. However, the piece must be free to tilt about the pivot line 31.

It may be noted that the pivot line 31 is always spaced longitudinally under the entry side of the track 10, and below that track so that the pivot line 31 is always beneath the solid part of the track 10 and not the downward side of the space between the track 10 and the transition piece 30. This is done with the purpose of avoiding an upward tilt of the transition piece 30 as the trolley first rolls onto it from the fixed track 10. Because there will always be a downward moment of the weight of the trolley onto the transition piece 30 there will not be a reversal of rotation of that transition piece tending to cause a "hammering" effect as the transition piece moves from upward to downward. Such a "hammering" effect causes undesirable fluctuations on any scale reading as can readily be seen.

It will now be apparent that as the wheel 12 of a trolley transitions from the track 10 onto the transitional track 30, the weight on that wheel will shift from being largely supported at the pivot line 31 of the transitional track to being almost totally supported by the projections 32 and 33. This is true because of the leverage caused by pivoting one end of the transitional track 30. Because of this relatively gradual shift of weight rather than the nearly instantaneous change, the oscillation is greatly reduced, and becomes nearly non-existent, with the result of much easier and quicker weighing which is also much more accurate.

Although it is not essential to the operation of the weighing, a modification shown in FIGS. 5–8 is desirable for the sake of accuracy. Because the pivot line 31 is located either directly below or to the permanent track side of the division between the permanent track 10 and the transitional piece 30, there is a small component of the weight of that transitional piece which will normally press onto the projection 33 of the weighing section 25. To avoid what amounts to added tare weight on the scale, and because that weight might be somewhat variable, a way has been devised to keep that weight off the projection 33 of the weighing section 25.

To accomplish the relief, the plate 36 which also supports the pivot piece 37 includes a small shelf 38. The transition piece 30 also carries a corresponding shelf 39. A compression spring 50 which may be relatively soft extends between these shelves. The spring must be strong enough to raise the transition piece 30 from the projection 33 on the weighing section 25 but should not be much stronger than that. For example, it should not be strong enough to interfere more than minimally with the pressing down of the piece 30 as it is loaded by the wheel 12 of the trolley.

In this way, any adjustment of the tare weight because of the weight of the transition piece 30 is avoided. Also, the weight on the scale will not be interfered with as the wheel 12 runs onto the weight section. Any effect on the effectiveness of the transition piece in the gradual transition of weight onto the weighing section 25 of the track will be reduced to a minimum because of the proportions of the spring 50.

Additional advantages in accuracy may be gained from an auxiliary transport system adapted to move the trolleys 11 over the weighing section 25 of track. This transit means includes a motor 40 which runs continuously. An electrically operated clutch 41 controls the engagement between the motor 40 and an operating shaft 42. The engagement of the normally disengaged clutch may be controlled by any well known means for triggering an electrical device. That trigger might be a contact device arranged to be contacted by a strap 13 or an arm 16, or it could be a pressure switch triggered by the weight of the wheel 12. The preferred device may be an electric eye switch actuated by the straps 13 breaking a beam in passing. The switch when actuated operates to engage the clutch to drive the shaft 42.

Figure 3:
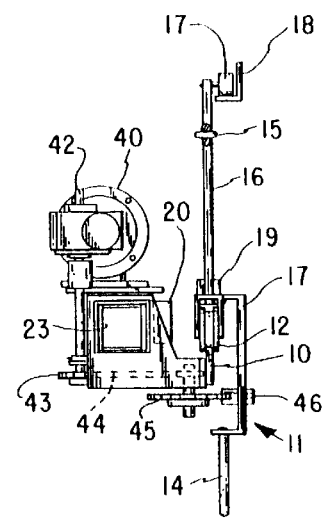
FIG. 3 is an elevational view axially of the track showing the end of the system.

A sprocket 43 on the shaft 42 drives an auxiliary chain 44 (FIG. 3) which in turn drives a finger chain 45 in a horizontal plane. This chain follows an elongated path between a driven sprocket at one end and an idler sprocket at the other end of the path, leaving a relatively straight run parallel to and relatively close to the underside of the weighing section 25 of the track 10. In the preferred embodiment, the chain carries two fingers 46 equally spaced on the finger chain 45. These fingers are adapted to engage the strap 13 of the trolley to move it along the weighing section 25 of the track 10, thus providing an auxiliary drive mechanism at this stage of the movement of the trolley. It will be noted that at any instant, the auxiliary drive will be engaged with only a single trolley.

In operation, as the trolley 11 approaches the scale mechanism along the track 10, it first triggers the electric engagement of the clutch drive 41 to cause the motor 40 to drive the finger chain 45. The proportions of the gears and sprockets is such that the lineal speed of the finger chain 45 is slightly greater than that of the main chain 15 so that upon engagement of a finger 46 with the strap 13, the trolley is advanced ahead of and out of contact with the dog 19 that had been providing propulsion. Because the finger 46 is supported by the chain 45 and indirectly, therefore, by the rail 25 and is far closer to the wheel 12 than is the main chain 15, there is no chance that there will be any resultant vertical component of force on the trolley 11, transmitted to the sides. Therefore, there is less opportunity for the introduction of error into the individual weight on the scales. Also the auxiliary device will be more steady because only a single trolley is propelled instead of the multiplicity of trolleys being moved by the main chain. This added steadiness helps also to avoid the swinging and related oscillating movement existing in prior scale systems.

As the trolley 11 passes over the weighing section 25, it is released by the finger 46 to coast a short way down the track 10 and then is again picked up by the dog 19 to be moved to the unloading area.

Thus, this invention provides a comparatively highly accurate and relatively fast system of weighing the moving trolleys and their load.

I claim as my invention:

1. A system for weighing—a—load on a trolley comprising a divided main track, trolley means—rolling—in one direction on said main track, weighing means—for bridging—the division in said main track section, a transition support section between said main track and said weighing track section, said rolling of said trolley means in said one direction defining an entrance end and a discharge end of said weighing track section, said entrance end of said transition support section being—in contact with and—rockingly supported—on a part of—said main track—at a pivot line—not further in said one direction than vertically below the entrance end of said transition support section, said discharge end of said transition support section being formed to engage and to be supported by said entrance end of said weighing track section.

2. The system of claim 1 in which powered transit means is positioned to engage said trolley means to move said trolley along said main track and over said weighing section.

3. The system of claim 2 in which said powered transit means includes a second track parallel to but spaced above said main track, arm means movably mounted on said second track, and a powered chain engaging said arm means to pull said arm means along said second track, said arm means being engagable with said trolley means to transmit motion of said arm means to said trolley means.

4. The system of claim 3 in which auxiliary transit means is suspended beneath said weighing track section, said auxiliary transit means including a driving mechanism engagable with said trolley means to move said trolley means at a linear speed slightly greater than the motion along said main track.

5. The system of claim 4 in which said auxiliary transit means includes a motive unit, auxiliary chain means driven by said motive means, said auxiliary chain means being engagable with said trolley means to move said trolley means at said slightly greater lineal speed.

6. The system of claim 4 in which said motive means includes a constantly running motor and means for engaging said trolley means, said means for engaging said trolley means being operable by electrical switch means in reaction to the passage of a trolley means.

* * * * *